US006966982B1

(12) United States Patent
Chang

(10) Patent No.: US 6,966,982 B1
(45) Date of Patent: Nov. 22, 2005

(54) AQUACULTURE WATER QUALITY ECOLOGY SYSTEM

(75) Inventor: Yung-Sheng Chang, Hsichih (TW)

(73) Assignee: Hi-Q Bio-Tech International Ltd., Ping Tung (TW)

( * ) Notice: Subject to any disclaimer, the term of this patent is extended or adjusted under 35 U.S.C. 154(b) by 0 days.

(21) Appl. No.: 10/892,095

(22) Filed: Jul. 16, 2004

(51) Int. Cl.[7] ............................ A01K 63/04; C02F 3/04
(52) U.S. Cl. .................. 210/150; 210/169; 210/416.2; 119/227; 119/260; 119/263
(58) Field of Search ............................... 210/150, 151, 210/169, 416.1, 416.2, 615, 620; 119/227, 119/259, 260, 263

(56) References Cited

U.S. PATENT DOCUMENTS

| | | | | |
|---|---|---|---|---|
| 3,841,999 A | * | 10/1974 | Bennett et al. ............. | 210/617 |
| 4,427,548 A | * | 1/1984 | Quick, Jr. ................... | 210/617 |
| 5,055,186 A | * | 10/1991 | Van Toever ................. | 210/150 |
| 5,160,622 A | * | 11/1992 | Gunderson et al. ......... | 210/617 |
| 5,223,129 A | * | 6/1993 | Hsieh .......................... | 210/150 |
| 5,958,239 A | * | 9/1999 | Sing ........................... | 210/605 |

FOREIGN PATENT DOCUMENTS

JP             10-304789      * 11/1998

* cited by examiner

Primary Examiner—Fred G. Prince
(74) Attorney, Agent, or Firm—Leong C. Lei

(57) ABSTRACT

An aquaculture water quality ecology system to improve water quality in an aquaculture pond by guiding water into a physical filtration tank at the top of the system, then flow into a sedimentation tank to rid of algae, pathogenic bacteria, and parasites before being dripped down to a separately provided ecology process tank containing bio-filtration balls; drops being broken into even smaller drops by the filtration balls; air blower on one side and an exhaustion pipe on the other side to blow away hazardous gases to the ambient leaving the clean water after the final filtration to flow into the aquaculture pond.

1 Claim, 4 Drawing Sheets

AQUACULTURE WATER QUALITY ECOLOGY SYSTEM

BACKGROUND OF THE INVENTION (a) Technical Field of the Invention

The present invention is related to an aquaculture water quality ecology system, and more particularly to one that improves the ecology of water quality by multiple layers of filtration to provide better growing environment for the aquatic species.

(b) Description of the Prior Art

Sufficient food is the first element to survive. Demands of food increases along with the size of population. Among the edibles, aquatic species takes a significant place either in nutrients or quantity. Advanced fishing gears though help significant increase of the catch; fishery resources at the same time are fast exhausting. Aquaculture has become an alterative to replace the source of marine catch. At the beginning, fresh water or seawater is directly introduced into an aquaculture pond depending on the species of the fish for the fish to grow in the aquaculture pond. Excrements from the fish and feeds not consumed contaminated the water in the pond resulting in the propagation of algae, pathogenic bacteria of zooplankton and/or phytoplankton, and parasites. Decayed excrements and residual feeds generated hazardous gases to threaten the growing of the fish in the pond. As a result, the fish was either infected or died to cause substantial loss to the owner of the pond. Therefore, the owner will give periodical filtration of the water in the pond using only filtration cotton for a preliminary filtration. The preliminary filtration does rid off certain foreign matters and suspensions in the water; but fails to remove algae, pathogenic bacteria of zooplankton and phytoplankton, parasites and hazardous gases. How to make the water in the pond cleaner in providing an optimal living environment for the fish is one of the topics pending satisfactory solution in the aquaculture.

SUMMARY OF THE INVENTION

The primary purpose of the present invention is to provide a water quality ecology system for aquaculture to improve water quality. To achieve the purpose, seawater is directed into a physical filtration tank provided on the top of the system to carry out the preliminary filtration before flowing into a sedimentation tank for plankton process to rid off algae, pathogenic bacteria and parasites to drip into a separately provided ecology process tank at the bottom of the system. The ecology process tank contains bio-filtration balls to break the drops into even smaller drops to separate hazardous gases from the water. An air blower is provided on one side and an exhaustion pipe extending from the other side of the ecology process tank to reach above the system. Hazardous gases are then exhausted into the ambient to release the clean water into the pond.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
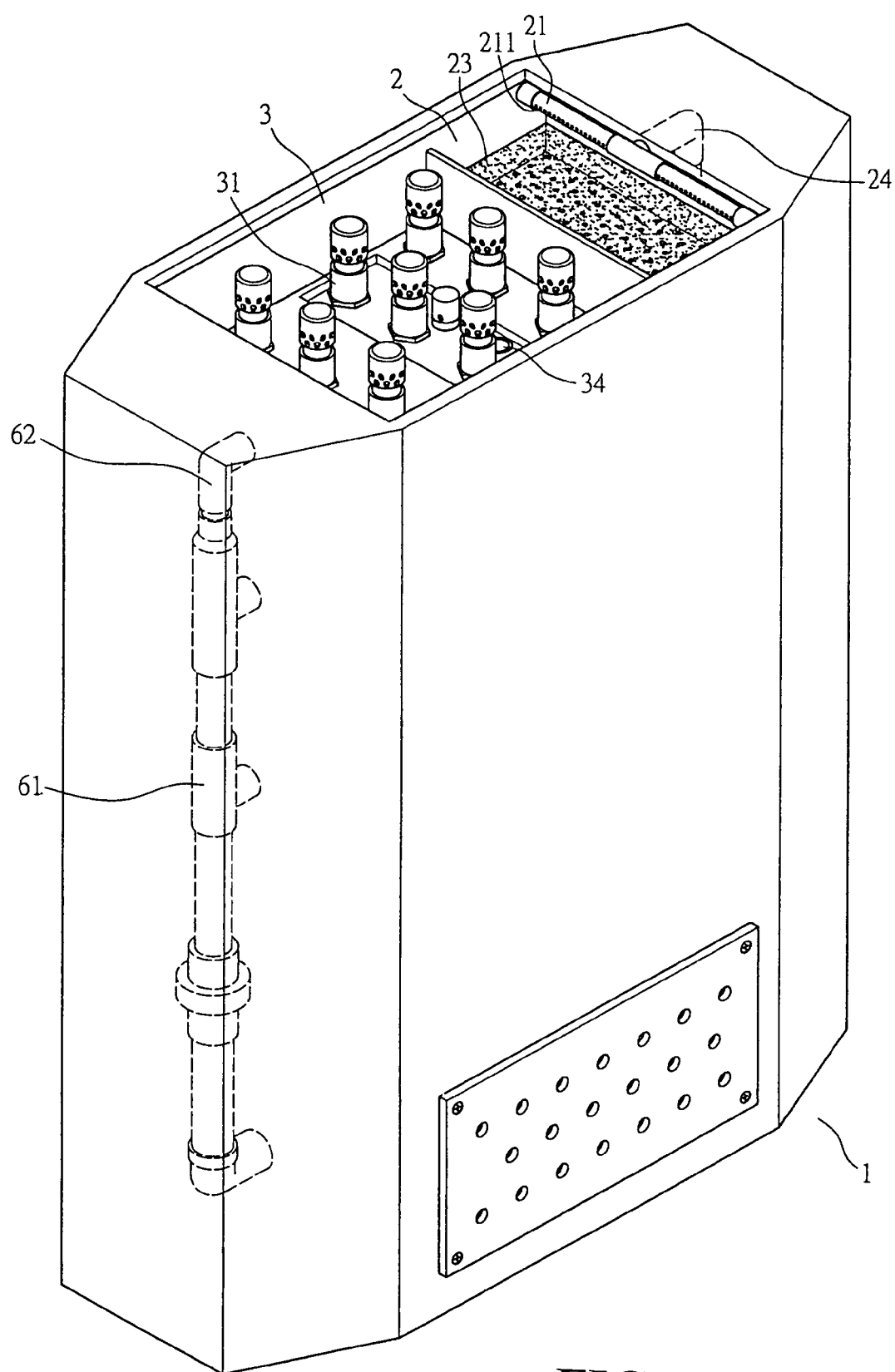
FIG. 1 is a view showing an appearance of a preferred embodiment of the present invention.
Figure 2:
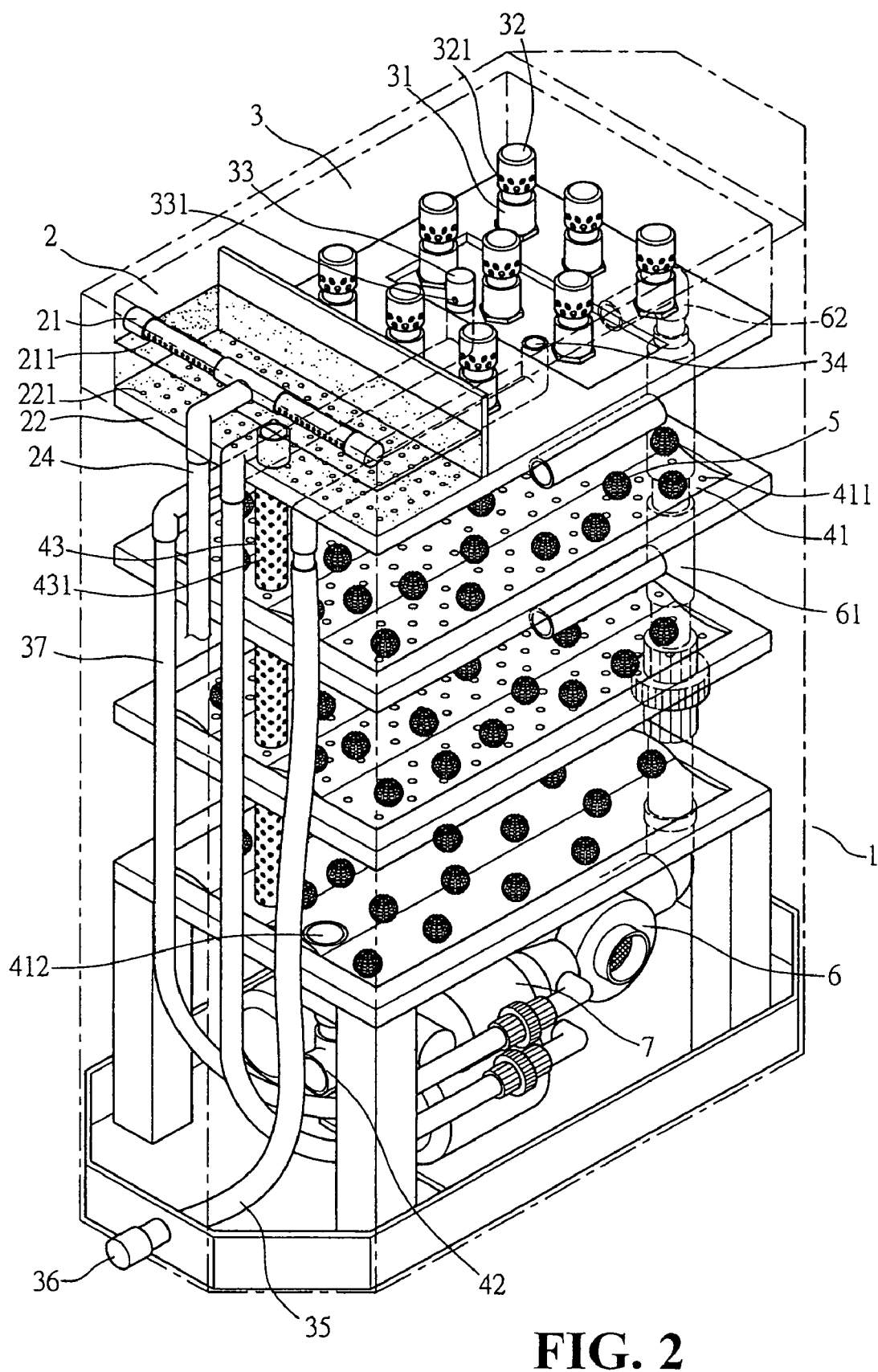
FIG. 2 is a sectional view of the preferred embodiment of the present invention.

Referring to FIGS. 1 and 2, an aquaculture ecology water quality system has a physical filtration tank 2 with a suspended base plate 22 disposed on the top of a system. A water inlet pipe 21 is provided on the physical filtration tank 2 and multiple holes 211 are arranged on the lower portion of the water inlet pipe 21. Multiple holes 221 are disposed on the base plate 22. A filtration material 23 is placed on the base plate 22. The water inlet pipe 21 is connected to an aquaculture pond by means of a pipeline 24. A water pump 8 (not illustrated) is provided in the pipeline 24 to pump the water from the aquaculture pond through the water inlet pipe 21, and those holes 221 into the physical filtration tank 2. A sedimentation tank 3 is provided side by side with the physical filtration tank 2 and the other side of the sedimentation tank 3 extends to where below the physical filtration tank 2. Multiple identical overflow pipes 31 are provided upright through the sedimentation tank 3.

Figure 3:
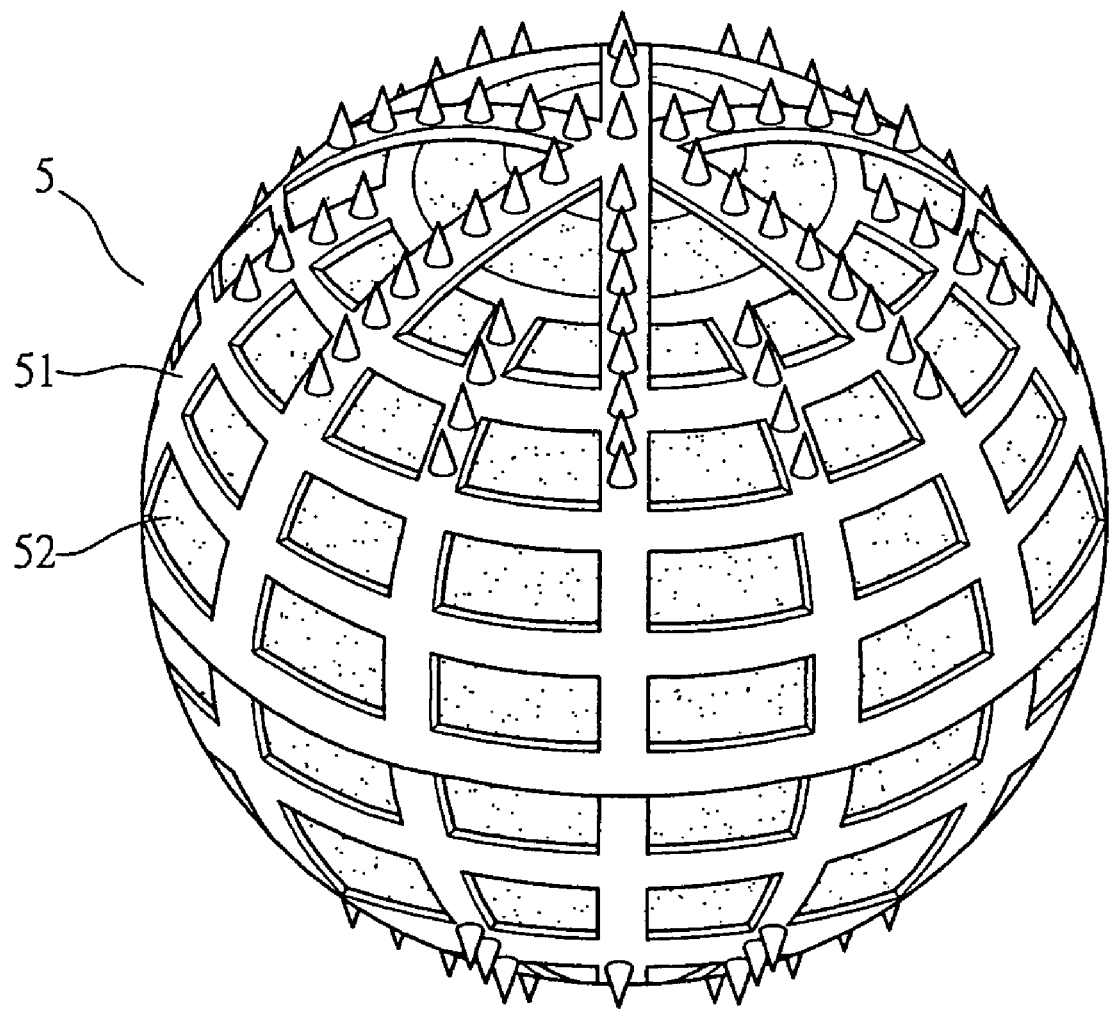
FIG. 3 is a perspective view of a bio-filtration ball of the preferred embodiment of the present invention.

Each overflow pipe 31 topped with a cap 32 and the cap 32 is at a height lower than that of the physical filtration tank 2. Multiple drip holes 321 are disposed on the peripheral of each cap 32 and a water guide pipe 33 is provided among those overflow pipes 31 at a height lower than that of the overflow pipe 31. A water inlet 331 is provided on the peripheral of the water guide pipe 33. A drain hole 34 is disposed at one corner of the sedimentation tank 3 and is connected to the ambient with a pipe 35. A switch valve 36 is provided at the terminal of the pipe 35 to control the on/off status of the drain hole 34. Multiple ecology process tanks 4 spaced at intervals among one another. There are three ecology process tanks 4 provided in the preferred embodiment as illustrated in FIG. 2. Wherein, multiple holes 411 are provided on a base plate 41 of each ecology process tank 4 with the exception that a drain hole 412, instead of multiple holes 411, is disposed at the base plate 41 of the ecology process tank 4 at the lowest deck. The drain hole 412 is connected with a drainpipe 42 to the aquaculture pond (not illustrated). Multiple bio-filtration balls 5 are paved on the base plate 41 of each ecology process tank 4. As illustrated in FIG. 3, the bio-filtration ball 5 is comprised of a hollow sphere 51 containing a filter 52. Meanwhile, an air pipe 61 connected to an air blower 6 is provided on one side of the system 1 and extends with a branch 62 into each ecology process tank 4. The air blower is disposed at where below the ecology process tank 4 at the lowest deck. Once the air blower 6 is activated, the air generated is delivered into each ecology process tank 4 through the branch 62 of the air pipe 61. An exhaustion pipe 43 extending upward to the ambient is provided on the other side of the ecology process tanks 4, and an exhaustion hole 431 is provided at where close to the top of the exhaustion pipe 43. A plankton processor 7 is provided in the space below the ecology process tank 4 at the lowest deck. The water guide pipe 33 of the sedimentation tank 3 is connected with a pipeline 37 to the plankton processor 7. In turn, the plankton processor is further connected into the physical filtration tank 2 with a pipe 71.

Figure 4:
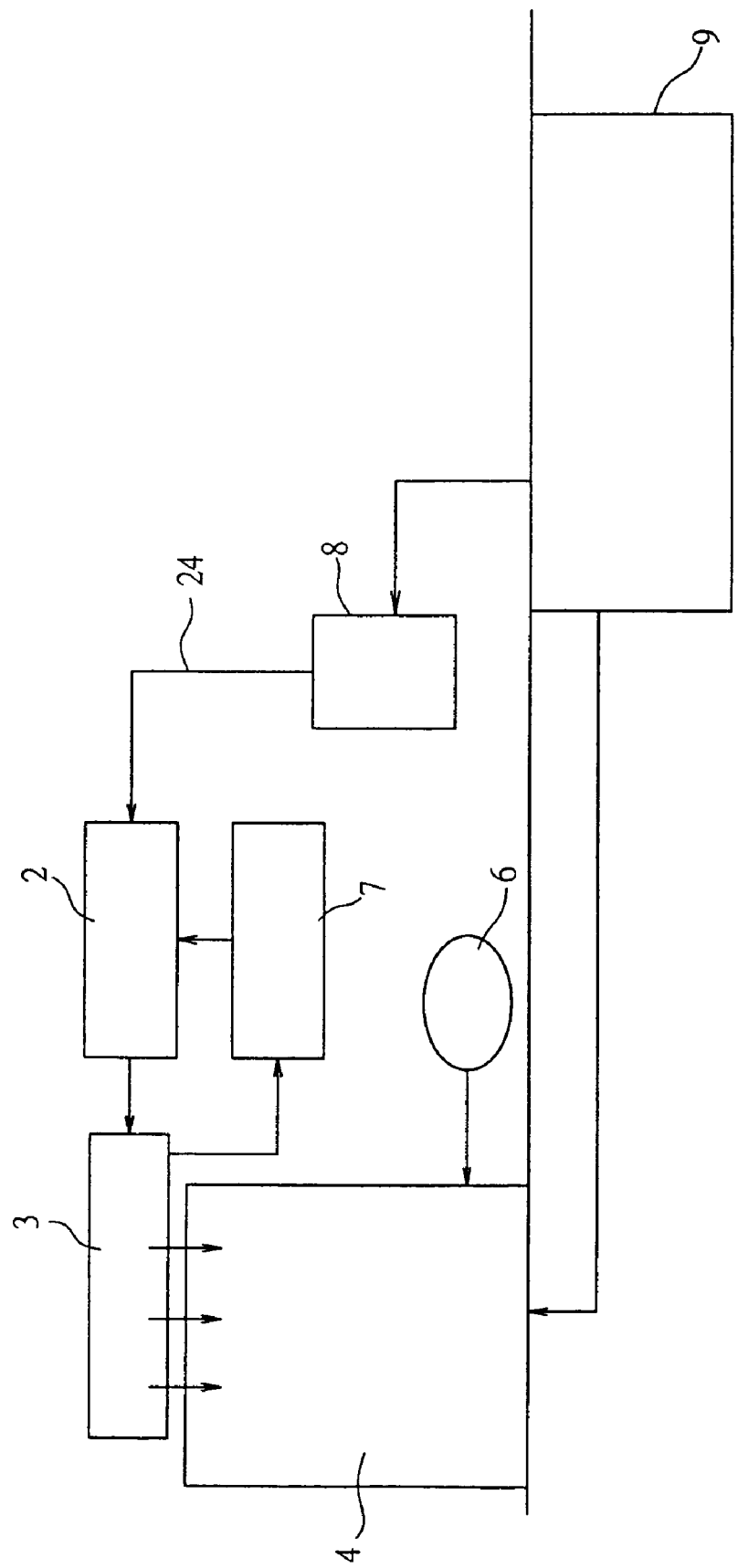
FIG. 4 is a flow chart showing the working process of the preferred embodiment of the present invention.

Now referring to FIG. 4, water in an aquaculture pond 9 is delivered by the water pump 8 via the pipeline 24 to the water inlet pipe 21 and drips into the physical filtration tank 2 through those multiple holes 211 on the water inlet pipe 21 to carry out the preliminary filtration through the filtration material 23 placed in the physical filtration tank 2 to rid off foreign matters in larger size including algae, feeds, and excrements in the water. The water completed with the preliminary filtration flows through those multiple holes 221 at the base plate 22 into the sedimentation tank 3. Whereas the pipe cap 32 is provided to the top of the overflow pipe 31, a certain height is provided between those drip holes 321 on the pipe cap 32 and the bottom of the sedimentation tank 3 to allow heavier sands or foreign matters carried by the water to settle down on the bottom of the sedimentation tank 3. When the level of the water in the sedimentation tank 3 rises up to that of those drip holes 321 on the pipe cap 32, the water seeps through those drip holes 321 and flows following the overflow pipes 31 into the ecology process tanks 4 below.

Water drops collides against those multiple bio filtration balls 5 and are broken into even smaller drops to release hazardous gases. Meanwhile, the air blower 6 is activated to blow air into those ecology process tanks 4 through the branch 62 of the air pipe 61 and the air flows upward to the ambient to create suction for carrying those hazardous gases released from the water drops through the exhaustion pipe 43 to be discharged into the ambient. The air from the air blower 6 carries oxygen to be mixed with those water drops to increase the oxygen containment in water. The water completed with the filtration in the ecology process tank 4 at the lowest deck is returned through the drain hole 412 and following the drainpipe 42 to the aquaculture pond 9.

The water drops flowing into the sedimentation tank 3 will partially enters into the plankton processor 7 through the pipeline 37 from the water inlet 331 of the water guide pipe 33 since the water inlet 331 of the water guide pipe 33 is at a height lower than that of those drip holes 321 on the cap 32. The water entering into the plankton processor 7 is pressurized and impacted to general multiple minute water drops and air bulbs in diameter of only few $\mu$'s to effectively remove algae, pathogenic bacteria of zooplankton and/or phytoplankton, and parasites in water to avoid massive propagation of algae before being delivered into the physical filtration tank 2 through the pipeline 71 for upgrading the filtration results. Accordingly, the aquaculture water quality ecology system of the present invention effectively upgrades the water quality to provide the optimal and healthy living environment for the aquatic species in the aquaculture pond.

Furthermore, the sedimentation tank may develop scales or other residuals on the bottom of the tank after a certain period of operation. Simply open up the switch valve 36 provided at the terminal of the drainpipe 35 to drain the contaminated water and residuals through the drain hole 34 and the drainpipe 35 to maintain the sedimentation tank 3 clean to prevent from affecting the filtration results.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. An aquaculture water quality ecology system, including a physical filtration tank and a sedimentation tank provided side by side on the top of the system, multiple decks of ecology process tanks, and a plankton processor at the bottom of the system; wherein, the physical filtration tank having its bottom suspended and a water inlet being provided on the physical filtration tank; multiple holes being provided on the side of the water inlet pipe, multiple holes being also provided on the base plate of the physical filtration tank, and a water pump being provided in the water inlet pipe;

the sedimentation tank extending from the other side not abutted to the physical filtration tank into where below the physical filtration tank, multiple upright overflow pipes being disposed at the bottom of the sedimentation tank, the top of each overflow pipe being provided with a cap at a height lower than that of the physical filtration tank, multiple drip holes being provided on the peripheral of the cap, a water guide pipe being provided among those overflow pipes, the water guide pipe being provided at a height lower than that of those overflow pipes, a water inlet hole being provided at the peripheral of the water guide pipe, a drain hole connected to the ambient with a pipeline being disposed at one corner of the sedimentation tank, and a switch valve being provided at the terminal of the pipeline;

multiple decks of ecology process tanks being provided below the sedimentation tank; multiple holes being disposed on a base plate of each ecology process tank with the exception of the base plate of the ecology process tank at the lowest deck, the base plate of the ecology process tank at the lowest deck being disposed with a drain hole; the drain hole being connected into a aquaculture pond via a drain pipe;

multiple bio-filtration balls being paved on the base plate of the ecology process tank, and each bio-filtration ball being comprised of a hollow sphere containing a filter;

an air inlet pipe connected to an air blower being provided on one side of the system, a branch from the air inlet pipe being extended into each ecology process tank, the air blower being provided in the space below the physical filtration tank at the lowest deck, and an exhaustion pipe provided with an exhaustion hole extending upward from on the other side in the ecology tank into the ambient; and a plankton processor being provided in the space below the ecology process tank at the lowest deck the water guide pipe from the sedimentation tank being connected to the plankton processor with a pipeline, and the plankton processor being further connected with another pipeline to the water inlet pipe of the physical filtration tank.

* * * * *